US006692006B2

(12) United States Patent
Holder (10) Patent No.: US 6,692,006 B2
(45) Date of Patent: Feb. 17, 2004

(54) HIGH-PRESSURE FILM-RIDING SEALS FOR ROTATING SHAFTS

(75) Inventor: Mark C. Holder, Mohnton, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 09/977,925

(22) Filed: Oct. 15, 2001

(65) Prior Publication Data

US 2003/0071422 A1 Apr. 17, 2003

(51) Int. Cl.$^7$ ................................................. F16J 15/16
(52) U.S. Cl. ...................................... 277/346; 277/348
(58) Field of Search ................................ 277/346, 348, 277/350, 352, 358, 367, 369, 370, 372, 373, 375, 377, 379, 390, 400, 401

(56) References Cited

U.S. PATENT DOCUMENTS

| | | | | |
|---|---|---|---|---|
| 2,908,516 A | * | 10/1959 | Stein | 277/548 |
| 3,194,492 A | * | 7/1965 | Koffinke | 494/1 |
| 3,554,561 A | * | 1/1971 | Weinand | 277/559 |
| 3,575,424 A | * | 4/1971 | Taschenberg | 277/411 |
| 3,874,677 A | * | 4/1975 | Ludwig et al. | 277/425 |
| 4,211,424 A | * | 7/1980 | Stein | 277/352 |
| 4,406,466 A | * | 9/1983 | Geary, Jr. | 277/400 |
| 5,174,584 A | * | 12/1992 | Lahrman | 277/400 |
| 5,284,347 A | * | 2/1994 | Pope | 277/305 |
| 5,509,664 A | * | 4/1996 | Borkiewicz | 277/543 |
| 5,558,341 A | * | 9/1996 | McNickle et al. | 277/400 |
| 6,227,547 B1 | * | 5/2001 | Dietle et al. | 277/336 |

FOREIGN PATENT DOCUMENTS

| EP | 1055848 A1 | * 11/2000 | F16J/15/30 |
|---|---|---|---|

* cited by examiner

Primary Examiner—Anthony Knight
Assistant Examiner—Vishal Patel
(74) Attorney, Agent, or Firm—Zigmund L. Dermer (57) ABSTRACT

A circumferential film-riding seal operative in a gaseous or liquid environment about a rotating shaft is provided so that it is able to function with extended lifetime, low leakage, and a high-pressure difference thereacross. These characteristics are achieved by the employment of a segmented seal ring mounted in tandem with a floating load ring surrounding the rotating shaft. The seal ring has a bore surface thereon confronting the shaft, and the bore surface has a circumferential lift region located downstream of a circumferential bearing region. The bearing region has additional lift grooves either in the seal ring or in the shaft surface confronting the bearing region, together with feed grooves connecting the additional lift grooves, respectively, to a higher-pressure region adjacent the shaft. In certain embodiments the shaft has a sleeve secured thereto, which confronts the bore surface of the seal ring and the load ring, and wherein the additional lift grooves and respective feed grooves may be formed in the shaft sleeve. Also, the shaft sleeve may have a segment of reduced diameter formed thereon so that the diameter of the sleeve confronting the load ring is smaller than the diameter confronting the seal ring to provide pressure balance across the load ring.

17 Claims, 5 Drawing Sheets

HIGH-PRESSURE FILM-RIDING SEALS FOR ROTATING SHAFTS

The present invention relates to a seal and particularly to an improved high-pressure film-riding circumferential seal for restricting fluid flow between rotating and stationary members, being operable with high pressure differences thereacross and having long lifetime. While usable with all fluid systems, this invention is particularly useful for sealing applications for dry gas environments.

BACKGROUND OF THE INVENTION

Circumferential sealing devices have gained wide acceptance in a variety of applications, including aero-derivative gas turbine engines and industrial turbo machinery. The use of these sealing devices in the industrial sector usually requires a seal life on the order of five years (43,800 hours) minimum based on continuous operation. These circumferential seals are contacting devices being pressure relieved—not balanced—and their application is usually limited to fifteen to twenty psig thereacross to yield the required life on a typical industrial turbo compressor. The low loading on the seal, which is necessary for achieving the required life, is accomplished by reducing the bore dam sealing length to a reasonably low value. Spring loading, both radial and axial, is likewise controlled by low values. Forces which inhibit the ability of the seal ring to track dynamic motion of the shaft (due to static run-out or vibration) result predominantly from the exposed clearance between the rotating shaft sleeve and the inner diameter of the metallic seal housing. Inertial forces are also present due to the acceleration of the seal ring attempting to track the rotor, but these are generally not a problem as the seal ring is made of a material such as carbon graphite with its low associated density, thus low weight. In the past, attempts to provide a circumferential film-riding seal to achieve these objectives were made by Taschenberg in U.S. Pat. No. 3,575,424, which resulted in a seal ring whose outer periphery was exposed to low pressure, and a minimum clearance was provided by a fixed housing component. Certain prior art structures have formed secondary seals with floating ring components, but these are associated only with non-rotating housing parts, such as the patent to Pope, U.S. Pat. No. 5,284,347; however, while this structure limits the clearance for a secondary seal, no one has provided a floating load ring primary gas seal structure that minimizes the clearance between a rotating shaft and a circumferentially disposed floating load ring.

SUMMARY OF THE INVENTION

It is Applicant's intention to provide a circumferential fluid sealing device (especially useful for gaseous environments, i.e., formed with compressible fluids) having long life and capable of operating with an extremely high pressure drop thereacross, up to 250 psi or more pressure difference, by providing a segmented circumferential sealing ring engaging a floating housing portion, herein called a load ring, mounted in tandem with the segmented seal ring, which serves to help define the clearance between the rotating shaft and the seal. The bore surface of the segmented seal ring is provided with a sealing region adjacent a sealing dam thereon and a bearing region upstream thereof in the direction of fluid flow. In one embodiment of this invention, the bearing section is also provided with lift pockets to move the seal segments away from the rotating shaft (or sleeve mounted on the rotating shaft) to reduce the frictional loads on the seal ring bore surface. Since the seal ring, in accordance with this invention, is made from a lighter weight material such as carbon graphite or a ceramic composite, the sealing components such as lift pockets may be formed in the harder metallic parts such as a metallic shaft sleeve, so that rubbing of the parts does not destroy the lift pockets, thereby reducing the operating life of the seal. The combination of the segmented seal and a floating load ring, together with the employment of lift pockets in a normal bearing region of a circumferential film-riding fluid seal, serve not only to increase the lifetime of the seal but also to permit the seal to operate with higher differential pressures thereacross, which pressure differences (for gas seals) may well be an order of magnitude above the 15–20 psig normally envisioned for seals for these applications having adequate lifetime. This invention also provides a circumferential fluid seal with a reduced seal gap along the seal even with a higher pressure difference across it. In addition, an embodiment is provided wherein the seal ring and the floating load ring are essentially pressure-balanced.

BRIEF DESCRIPTION OF THE DRAWINGS

The specification includes claims which particularly point out and distinctly claim the subject matter which the Applicant considers to be his invention. A more complete understanding of the invention will be gained from the following detailed description, which is given in conjunction with the accompanying drawings, in which:

DETAILED DESCRIPTION OF THE DRAWINGS

Figure 1:
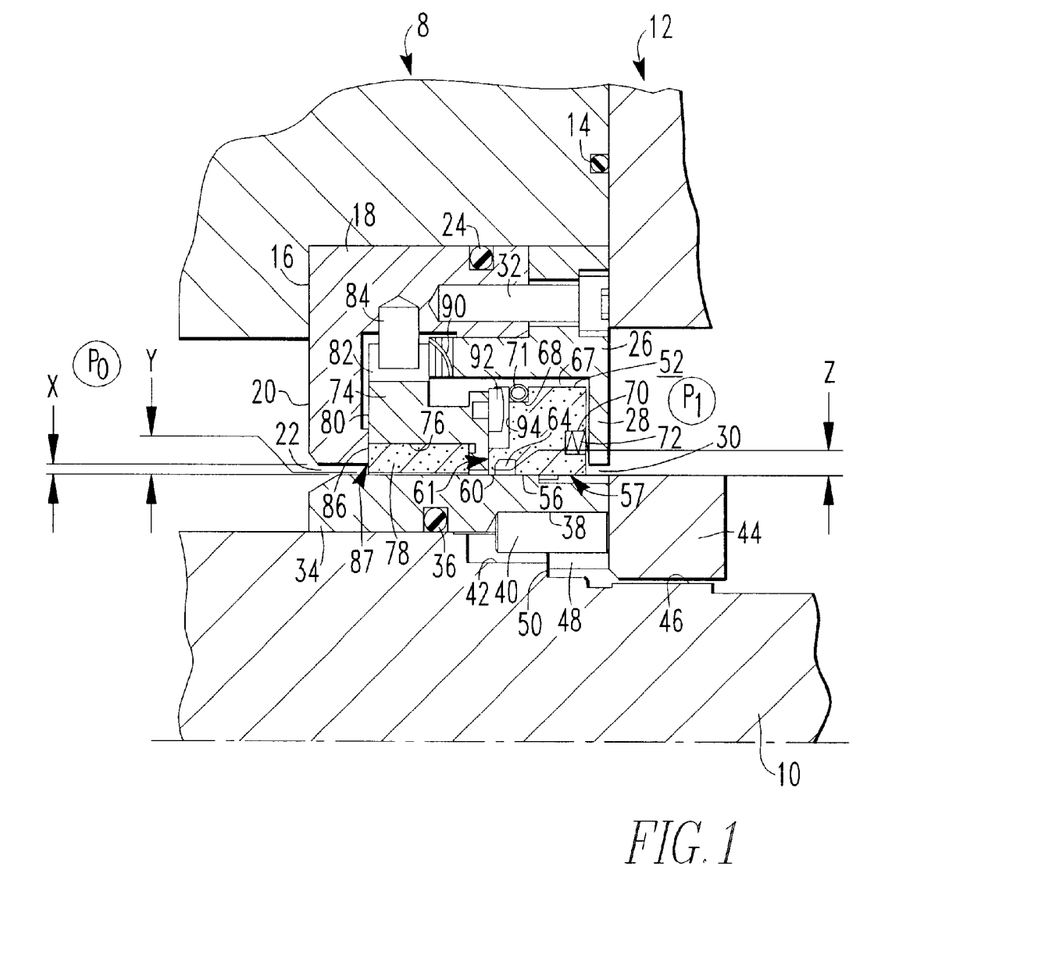
FIG. 1 is a cross-sectional schematic illustration of a seal system embodying this invention, shown in conjunction with a fixed housing and a rotatable shaft with only the shaft and seal system above the shaft centerline being illustrated.

Referring now to the drawings, wherein like reference characters are used for like elements throughout and modifications of elements are designated by the same reference characters primed, FIG. 1 is a schematic sectional view through an embodiment of the seal system of this invention and includes a machine housing 8 shown schematically, containing a shaft 10 therein, which is rotatable. While not illustrated in FIG. 1, it is clear that the housing 8 is essentially a housing separating different machine segments thereof, e.g., the housing of a compressor, and has a rotatable shaft therein extending through housing 8 to be engaged by a drive mechanism (not shown) such as an electric motor or turbine, and at the other end thereof to be engaged by a working mechanism (not shown) such as the blades of a compressor, etc.

In this example, housing 8 is connected to a removable housing segment 12, which is sealingly secured to housing 8 to prevent leakage therefrom by a suitable seal such as O-ring 14, so that no leakage from the interior of housing 8 passes through the juncture between housing 8 and segment 12. In this joint, the securing device (not shown) can be removed to provide access to the circumferential seal (to be described). Housing 8 is provided with a downwardly extending shoulder 16, which is opposed to the housing segment 12 and which faces the rotatable shaft 10. Positioned within housing 8 and against shoulder 16 is an annular seal housing 18 having a generally L-shaped cross-section which is formed from metal and includes a downwardly extending annular flange 20 having a central opening 22 therein. Leakage between seal housing 18 and housing 8 is prevented by the provision of an annular circumferential groove containing an O-ring 24 to prevent fluid flow along the juncture between seal housing 18 and machine housing 8. A removable cover ring 26 is provided for seal housing 18, it is mounted at the end of seal housing 18 adjacent housing segment 12 and includes a downward annular flange 28 thereon, having an opening 30 therein, which is generally in alignment with the opening 22 in flange 20 and axially spaced therefrom along shaft 10. The seal housing 18 and cover ring 26 are secured together by means of bolts circumferentially spaced thereabout such as cap bolt 32 (only one of which is shown) and form an annular region between the axially spaced flanges 20 and 28 for receiving components of the seal system.

The shaft 10 is provided with a neck down portion which begins approximately midway between the flanges 20 and 28, when the shaft is assembled in housing 8, such that the shaft may receive a shaft sleeve 34, which is mounted on the outer surface thereof in a leak-type manner by use of an outwardly extending circumferential groove and O-ring combination 36 to prevent leakage in the space between the shaft 10 and sleeve 34. Rotation of the sleeve 34 relative to shaft 10 is prevented by at least one recess 38 formed in shaft sleeve 34 aligned with a complementary recess 42 in the shaft 10. A pin 40, which extends into both recesses 38 and 42, is fixed in position by suitable means such as by an annular lock nut 44, which is surrounded and secured to the shaft by suitable means such as by a threaded connection at 46. The shaft sleeve 34 has a projection 48 engaging shaft shoulder 50 to maintain the sleeve 34 axially in position on shaft 10.

Sleeve 34 is positioned on shaft 10 so that it passes through the openings 22 and 30 in axially spaced flanges 20 and 28. Positioned in the opening between flanges 20 and 28 and adjacent flange 28 is a segmented primary seal ring 52. Segmented seal ring 52 is also illustrated in FIGS. 2A, 2B, and 3–7. In this example (see FIGS. 2A and 2B), segmented primary seal ring 52 is formed from three segments 54, each of the segments including an offset tongue portion 55 and a diagonally cut groove portion 58 (see FIG. 7), such that the tongue portion 55 also has a diagonal face (not shown) which is closely received in the groove 58 to prevent fluid flow either radially or axially between the segments 54. In this example, each seal ring segment 54 is formed entirely from a material having adequate abradability, low density, low weight, and adequate lubricity, such as a carbon graphite composite material or a ceramic material such as silicon nitrate or silicon carbide. Seal ring segments include a circumferential primary seal bore surface 56 thereon positioned to engage the outer circumferential surface of the shaft sleeve 34, with the latter desirably being formed entirely of metal and preferably having a hard-facing coating thereon at positions of potentially frictional engagement with the seal ring segments 54. It will be appreciated that, while the use of a separate shaft sleeve 34 for shaft 10 is illustrated herein, the shaft 10 itself may serve as the sealing surface for the seal ring 52, and the outer circumferential surface of shaft 10 may have pockets 96 and feed grooves 98 (as will be described) formed thereon, thereby omitting shaft sleeve 34 from the seal system.

The seal ring segments 54, when placed end to end, form a continuous circumferential bore surface 56 and a substantially continuous sealing dam 62 on the edge of the bore surface remote from the flange 28. Each of the seal ring segments has a substantially continuous sealing dam groove 64 on the bore surface 56 located adjacent the upstream side of the sealing dam 62. The sealing dam groove 64 terminates in each of the segments 54 at the female end adjacent the groove 58 and the tongue portion 55; thus except for a small segment of the bore surface 56 at the juncture of each of the segments 54, the sealing dam groove 64 is essentially continuous.

Figure 5:
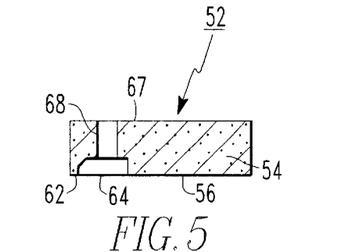
FIG. 5 is an enlarged sectional view of the seal ring of FIG. 2A, taken along the lines 5—5 thereof.
Figure 6:
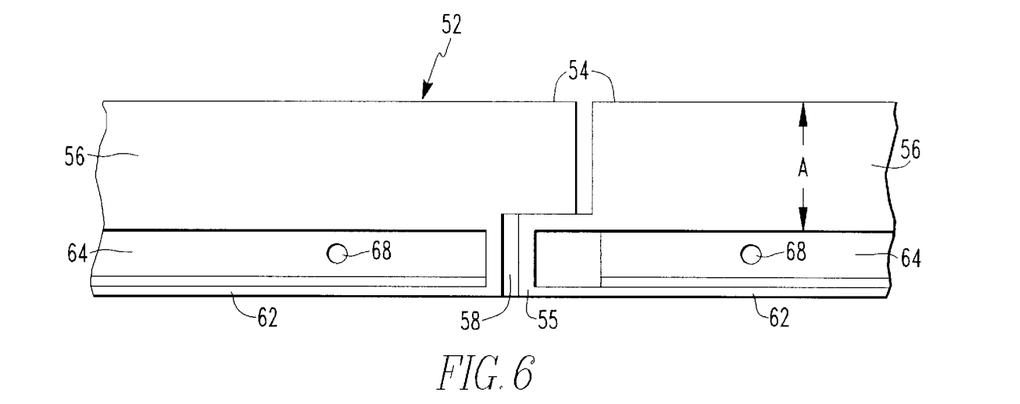
FIG. 6 is an enlarged fragmentary plan view of the bore surface of the seal ring of FIGS. 1–5, illustrating the joint between two of the segments thereof.
Figure 7:
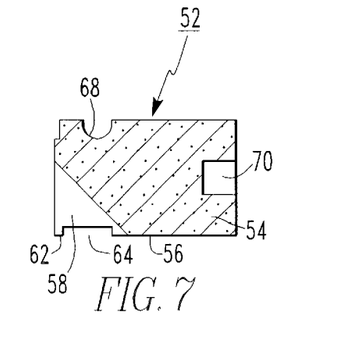
FIG. 7 is an enlarged sectional view of the seal ring of FIG. 2A, taken along the lines 7—7 thereof.

As shown in FIGS. 1, 5, and 6, the sealing dam groove 64 is in fluid communication with the rear or outward circumferential surface 67 of each seal ring segment 54 by a plurality of openings 68, which are generally equidistantly spaced around the seal ring segments 54 in order to provide fluid communication between the sealing dam groove 64 and the gas pressure on the side 67 of the seal ring segments 54. The last-mentioned surface 67, as will be explained hereinafter, is exposed to a higher pressure region P1 within the housing 8.

Figure 2A:
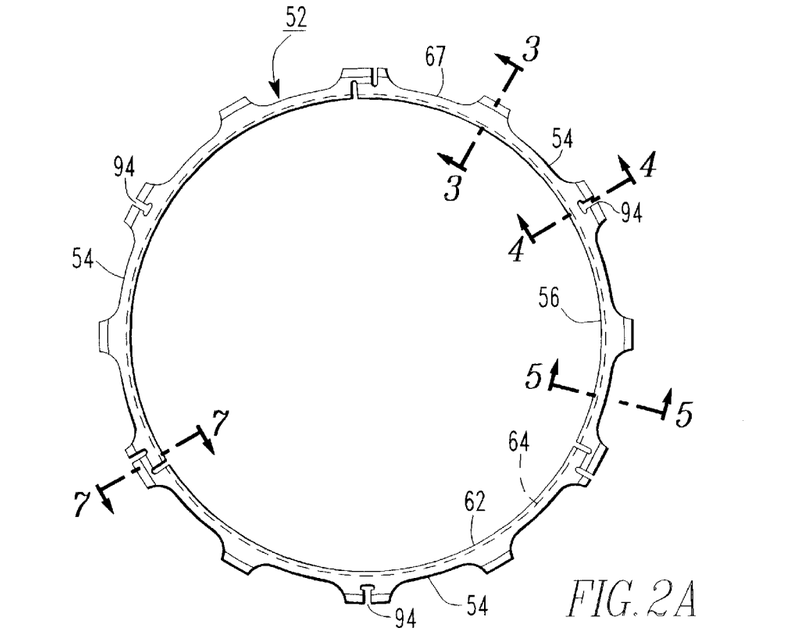
FIG. 2A is a plan view, reduced in size, illustrating the left side of the seal ring of FIG. 1.
Figure 2B:
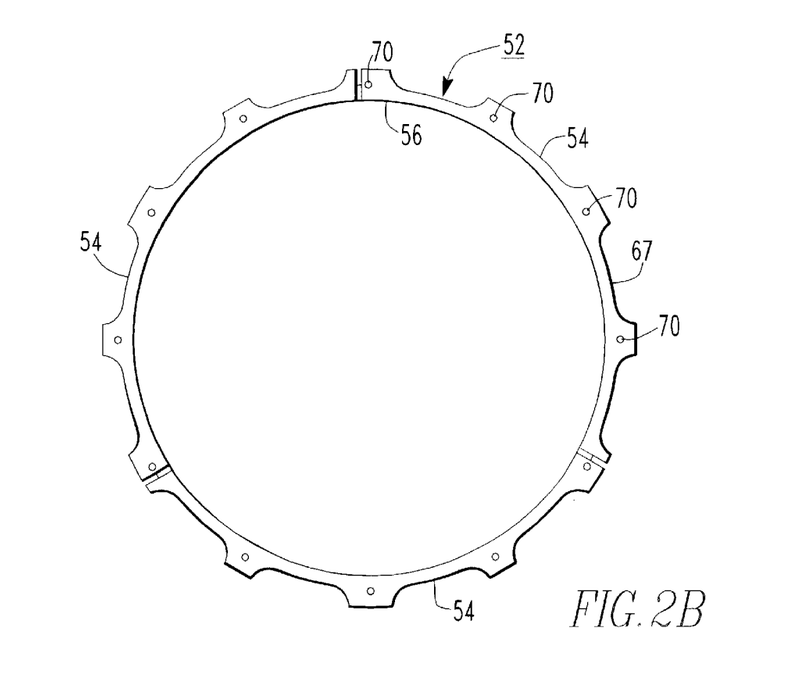
FIG. 2B is a plan view of the seal ring of FIG. 1, illustrating the right side of the seal ring of FIG. 1, looking from right to left.
Figure 3:
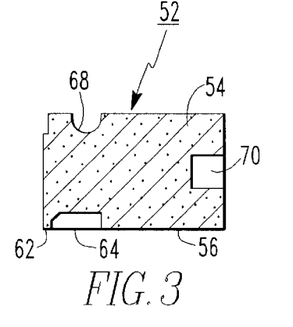
FIG. 3 is an enlarged sectional view through the seal ring of FIG. 2A, taken along the lines 3—3 thereof.
Figure 4:
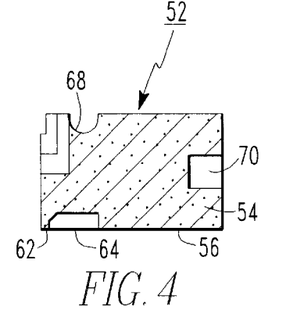
FIG. 4 is a view similar to FIG. 3, taken along the lines 4—4 of FIG. 2A.

As shown in FIGS. 1, 3, 4, and 7, the seal ring segments 54 include in the outer surface 67 thereof a circumferential recess 68 which extends around the periphery of the seal ring 52 and receives a garter spring 71 therein which biases the seal ring segments 54 radially inwardly toward the shaft 10 and shaft sleeve 34. In addition, the seal ring segments 54 are each provided with a plurality of spring-receiving recesses 70 located in the right radial surface thereof, which, when the seal is assembled, faces the flange 28 of the seal cover 26. As illustrated in FIG. 2B, four such recesses 70 are provided in each of the seal segments 54 and are served to receive coil springs 72 (FIG. 1) in each of the openings to bias the seal ring segments 54 away from flange 28 and toward flange 20.

As shown in FIG. 1, an essentially unitary floating load ring 74 is interposed between seal ring segments 54 and flange 20 of seal ring housing 18. Floating load ring 74 desirably is formed from a metal and includes a downwardly and axially facing recess 76 in the inner circumferential surface thereof, in which there is disposed an insert 78 which is fixedly secured thereto by suitable means such as by a shrink fit. Insert 78 extends radially inwardly of the inner circumferential surface of the load ring 74 and slightly outwardly of the radial surface 80 on the side of the load ring facing flange 20. The load ring insert 78 is formed from a suitable material such as that forming each of the seal ring segments 54 and is positioned to be the component of the floating seal ring such that, in the event of engagement with the shaft sleeve 34, the insert would frictionally engage the sleeve 34. Similarly, the radial surface of the insert 78 adjacent the flange 20 is positioned to engage the latter to form an auxiliary seal, rather than having engagement of the metallic floating load ring 74 with the metallic flange 20. The outer radial surface of the load ring 74 includes one or more recesses 82 therein, which receive an anti-rotational pin 84 fixedly secured in a recess in seal housing portion 18 and, with the pins 84, serving to prevent rotation of the floating load ring relative to the shaft 10 and shaft sleeve 34. The pins 84 are loosely received within the recesses 82 to permit the seal ring to float without interference by the pins 84 and thereby move a limited amount in the radial direction and in the axial direction to permit assembly of the seal system.

It will be seen, also in FIG. 1, that the flange 20 has an annular projection 86 extending toward load ring 74 at the lowest segment of the radial surface thereof, whereby engagement of load ring 74 with flange 20 to form the auxiliary seal 87 occurs only between load ring insert 78 and projection 86. It will be appreciated that the radial metallic surface on projection 86 is finely machined and desirably provided with a hard coating thereon to provide an essentially flat surface. The latter surface engages the adjacent radial surface of load ring insert 78, whose engaging surface is also machined and/or lapped to be essentially flat within a very low tolerance range. Similarly, all of the surfaces of load ring insert 78 are lapped essentially flat to prevent any leakage between the metal and non-metallic parts of load ring 74 and insert 78 and to maintain an essentially constant gap between the load ring's inner circumferential surface and the shaft sleeve 34. A biasing device such as a wave spring 90 is interposed between the load ring 74 and the cover ring 26 to form the auxiliary seal 87 by biasing the load ring 74 into engagement with the projection 86 on flange 20. The circumferential surface of the load ring 74 that faces flange 28 is provided with a plurality of anti-rotational pins 92, with at least one pin 92 being provided for each seal segment 54, with the pins 92 extending into recesses 94 (see FIG. 2A) in each of the seal segments 54 to prevent their rotation relative to both the load ring 74 and the shaft sleeve 34. When the seal and load ring and associated components are assembled into the seal housing 18, it will be seen that the seal segments 54 are biased into engagement with the shaft sleeve 34, creating the primary seal 57, and also with the radial surface on the adjacent side of the floating load ring 74, forming the secondary seal 61. It will be appreciated that the area of engagement on the latter surface of load ring 74 is finely machined and hard-faced to minimize wear between the components as well as to minimize leakage therebetween. For the auxiliary seal 87, load ring 74 is biased against shoulder 86 of flange 20 by wave spring 90 and also by coil springs 72.

It will be appreciated that housing 8 has two regions identified by the numerals P1 and P0 of different pressures therein, with region P1 (on the right-hand side of FIG. 1) being of higher pressure and region P0 being maintained normally at a lower pressure. It is the intention of the seal system of this invention to maintain the pressure difference between regions P1 and P0. Thus, the pressure in region P1 is also present in the space between flanges 20 and 28 so that higher pressure is on the radial side of the seal ring segments 54 located adjacent flange 28, on the outer circumferential sides of the seal ring 52 and of the load ring 74. Leakage of fluid (gas) between the flange 20 and its projection 86 and floating load ring 74 is prevented by auxiliary seal 87 formed therebetween, and leakage along the radial surface of load ring 74 closest to the flange 28 and the seal ring 52 is also prevented by frictional engagement of surfaces on those components, forming secondary seal 61 under the load of springs 72 and 90. Thus all leakage flow is intended to pass between regions P1 and P0 only along the seal gap, i.e., between the bore region 62 of seal ring 52 and the space between seal ring insert 78 and the outer circumferential surfaces of sleeve 34. It is intended that the primary seal 57 of this invention be a film-riding seal operative for a long lifetime (5 years or more) in an environment where the pressure difference between regions P1 and P0 may be up to 250 psi or more (contrasting seals of this invention with those now existing in industry for these applications where the pressure difference is permitted to be only 20–30 psi) to achieve the designed lifetime of 5 years. In furtherance of this purpose, it will be seen that the flow path in the bore region 56 of the seal ring 52 includes moving in the direction of fluid flow in the upstream circumferential bearing region between the arrows A (FIG. 6) and a lift region adjacent sealing dam 60 downstream thereof created by high pressure fluid flow across the sealing dam, with high pressure being introduced into the sealing dam groove 64 through passageways 68.

Figure 8:
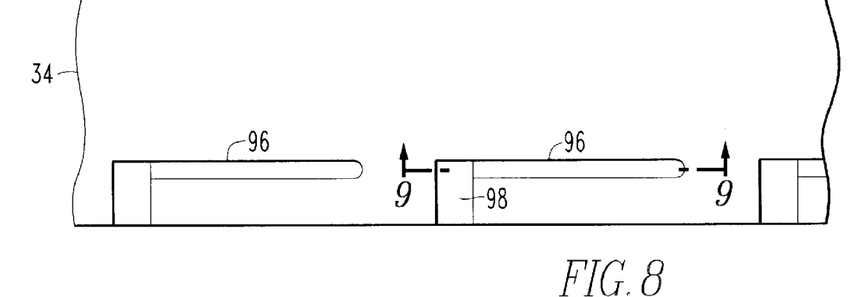
FIG. 8 is a fragmentary plan view of a portion of the circumferential surface of the shaft sleeve employed in this invention, illustrating the lift pockets and feed grooves for the bearing segment of the segmented seal ring bore surface.
Figure 9:
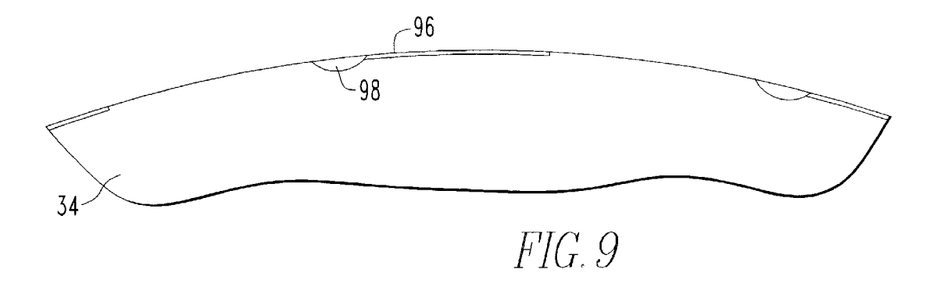
FIG. 9 is a sectional view through the shaft sleeve of FIG. 8, taken essentially along the lines 9—9 thereof.

It is Applicant's specific intention that the forces tending to cause rubbing between the bearing region A of the seal ring 52 and the sleeve 34 be relieved in order to ensure the long lifetime at the pressure differences suggested above. In furtherance of this purpose, a pressure relieve system as illustrated in FIGS. 8 and 9 is provided, wherein shallow, circumferentially extending, relatively short lift pockets 96 are provided in the bearing region A of the seal ring in spaced relationship with each other to reduce the friction or rubbing potential of that region of the seal ring 52. In this example, the lift pockets 96 are formed in the shaft sleeve 34 and are fed high pressure by axial passageways 98 formed in shaft sleeve 34, which communicates with region P1 in the housing 8. In this example, the lift pockets 96 of FIG. 9 are aligned with each other, although they may be offset and overlapping in the bearing region, if desired, as long as they are disparate from each other. From FIG. 1 it will be seen that the passageways 98 underlie the portion of the bearing region A of the seal segments 54 and extend upstream of the bearing region A to be exposed to high pressure (P1). It will be appreciated that the material forming the sleeve 34 is a harder material than that forming the seal segments 54; thus, in the event of any rubbing engagement of seal segments 54 with shaft sleeve 34, any wear will occur on the softer seal segments 54, thereby maintaining the integrity of the lift pockets 96 (it being understood that such pockets are very shallow, on the order of 0.5 milli-inches or less, so that they could disappear in the event of extended frictional engagement between shaft sleeve 34 and the surface of the seal segments 54 if they were formed on the segments 54. It is possible to form the passageways 98 and lift pockets 96 in the seal ring segments 54 without departing from the spirit of this invention; however, it will be appreciated that the creation of the pockets 96 and passageways 98 in the harder shaft sleeve 34 will ensure that these pockets and passageways are retained throughout the lifetime of the seal, thus providing a distinct advantage.

Figure 10:
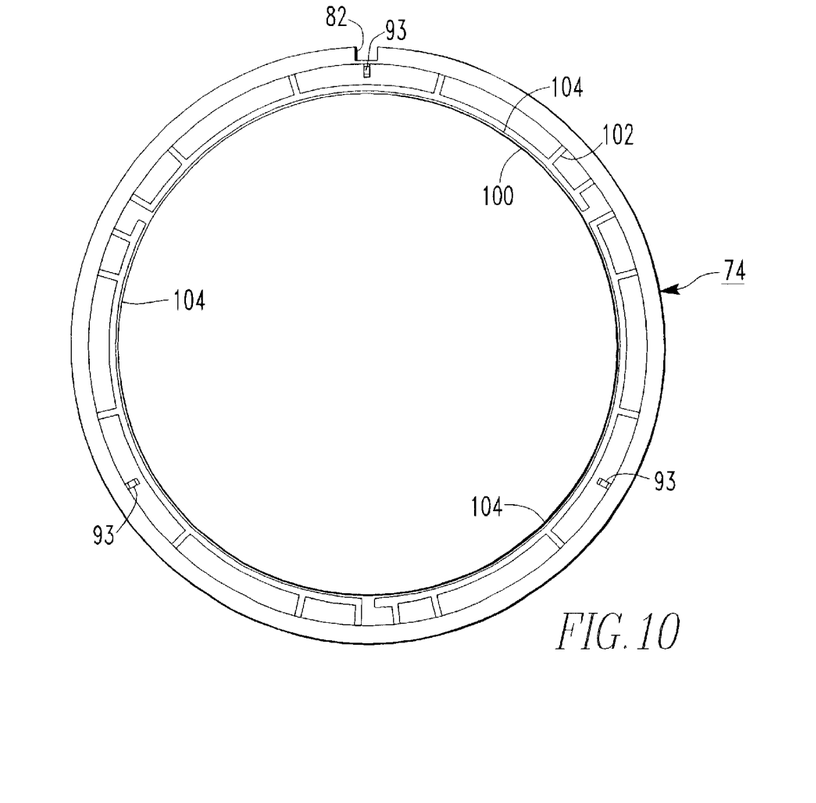
FIG. 10 is a plan view, reduced in size, of the right radial surface of the floating load ring of FIG. 1, illustrating the load ring surface looking from right to left in FIG. 1.
Figure 11:
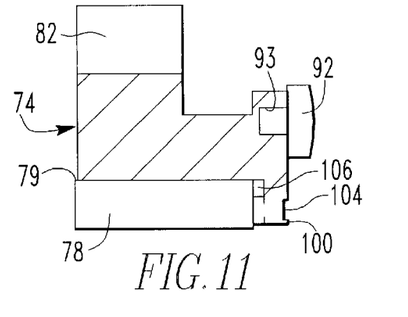
FIG. 11 is an enlarged sectional view through the load ring of FIGS. 1 and 10.

FIGS. 10 and 11 depict the floating load ring 74 in plan view from the surface thereof on which the secondary seal 61 is formed, with a sealing dam 100 provided thereon adjacent the inner circumferential bore surface of load ring 74. The sealing dam 100 is formed on the metallic portion of the load ring, and the dam is made as narrow as is practical to minimize pressure loading. In addition, pressure loading is further reduced by the provision of radial grooves 102 on the surface of load ring 74 positioned radially outwardly of sealing dam 100, which grooves 102 connect with three spaced circumferential grooves 104, the grooves 104 being aligned with each of the seal ring segments 54 when assembled. Thus grooves 104 are not interconnected with each other, but are separated by raised portions therebetween. Openings 93 are provided in the load ring 74 to receive the anti-rotation pins 92 therein and keyway 82 is provided to receive anti-rotation pin 84 (FIG. 1), as previously described. As mentioned above, insert 78 extends outwardly of the surface of load ring 74 on the side facing flange 28 and forms a shoulder 79 so that frictional engagement between insert 78 and the projection 86 on flange 20 occurs between projection 86 and insert 78 rather than a metal-to-metal contact. As shown in FIG. 11, a plurality of feed grooves 106 are machined on the radial surface of the metallic portion of load ring 74 that receives the insert or liner 78, which serves to exhaust any gas leakage which occurs at the shrink interface between the metallic portion of the load ring 74 and the insert 78 and prevents these components from separating.

By distribution of clearances in the seal system, the primary seal ring face load can be greatly reduced, i.e., the load on surface 61 of seal ring 52. In FIG. 1, the clearances referred to are shown with exaggerated dimension, and the radial clearance X comprises the required clearance for machine assembly and tolerance, i.e., between opening 22 at the inner circumferential surface of flange 20 and the outer circumferential surface of shaft sleeve 34. This tolerance is designed to be 0.035 inches (+). The floating load ring 74 is free to float in its chamber with the seal housing 18 by an amount of X in the radial direction and rides over the rotating shaft sleeve 34 with a practical low clearance Y between shaft sleeve 34 and load ring insert 78 of usually about 0.005 inches (5 mils). The clearance Y is set based upon practical machine-allowable vibration alarm/trip setting—in other words, to allow free vibration of the shaft within the ring bore without continuous contact. The clearance between the metallic floating load ring 74 and shaft sleeve 34 is clearance Z, which is greatly reduced, must be no less than clearance Y (between load ring insert 78 and shaft sleeve 34) to avoid contact, and is preferably between 0.005 and 0.010 inches (5–10 mils). This clearance produces a total pressure-unbalanced load on the primary seal ring against the floating load ring. This pressure load is now only a fraction of that which would be produced by clearance X. Note that the bore clearance at the sealing dam 60 is significantly lower than these clearances, that is, on the order of 0.0002 inches (0.2 mils), remarkable for a primary circumferential gas seal gap.

Figure 12:
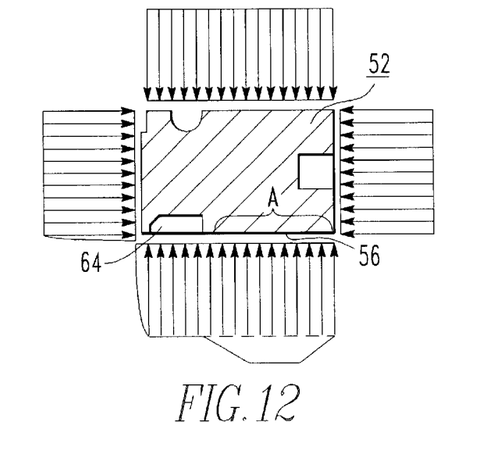
FIG. 12 is an enlarged pressure diagram across a seal ring segment of FIGS. 1 and 3.
Figure 13:
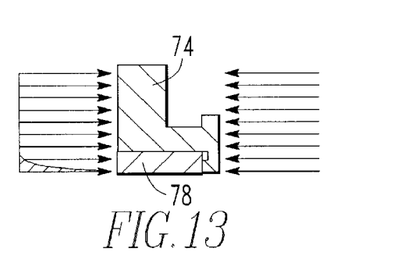
FIG. 13 is a pressure diagram showing the forces across the load ring of the embodiment of FIG. 1.

With reference to FIG. 12, wherein the force diagram of loads on the seal ring segments 54 is illustrated during operation, it will be seen that there is a net upward force on seal ring 52 formed by the lift pockets in the bearing region A of the seal ring segments 54. FIG. 13 illustrates the load on the load ring of FIGS. 1–10 and an unbalance in the side loads thereon by the hatched area thereof. Thus the load ring in this example is unbalanced.

Figure 14:
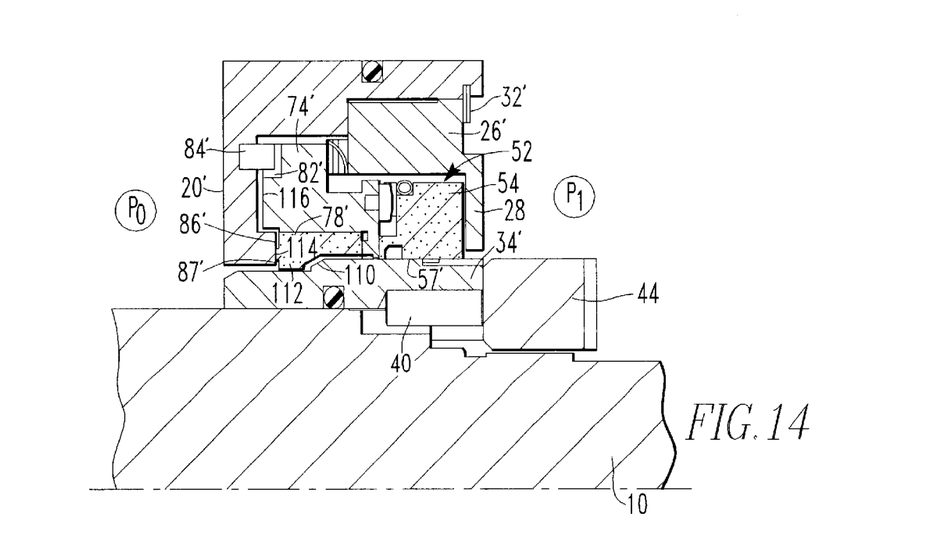
FIG. 14 is a schematic sectional view similar to FIG. 1 of another embodiment of this invention, wherein a balanced seal is provided.
Figure 15:
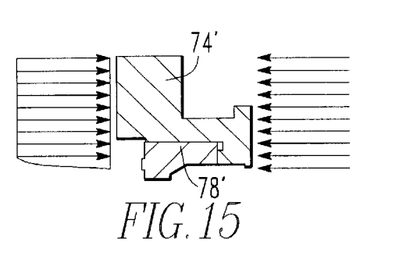
FIG. 15 is a pressure diagram showing the forces acting on the load ring of the embodiment of FIG. 14.

In an alternative embodiment in FIG. 14, there is depicted a seal system of this invention wherein the load ring may be made to be balanced. Like components of FIG. 14 will not be further described; however, it will be seen that in this example the shaft sleeve 34' is provided on the outer circumferential surface with a downwardly extending shoulder 110 which faces flange 20 and is engaged by a nose portion 112 on shoulder 110 on the load ring insert 78'. In addition, a nose portion 114 on the load ring insert 78' engages the outer surface of projection 86' to form the auxiliary seal 87' therebetween. The radial length of shoulder 110 is dependent upon the radial length of the nose portion 114 to achieve pressure balance on load ring 74'. Furthermore, the load ring 74' is provided with a projecting surface 116 extending toward flange 20, and the keyway 82' is formed on the side within projection 116, with anti-rotation pin 84' extending into keyway 82' from flange 20. In this embodiment, the securing device for the cover 46' is a snap ring 32'. FIG. 15 depicts the force diagram on the balanced load ring of FIG. 14 and shows essentially pressure-balanced loads thereon.

As pointed out above, the pressure load on the secondary seal at 61 and that on seal 57' (FIG. 14) may be reduced by up to 25% when compared with the primary seal pressure loads in current circumferential seals, thus providing a long-lived film-riding circumferential fluid seal capable of operating at pressure differences, when employed in a gaseous environment, of more than 1½ orders of magnitude greater than current circumferential sealing technology used in the field. Furthermore, the film-riding geometry in the bearing region allows the contact-free operation to achieve long life. The bearing and sealing functions are totally separate entities and not dependent on one another. The fluid bearings are fed high-pressure fluids by the deep feed grooves, while the sealing dam and the bore are fed the same via the drilled passageways 68 in the seal ring segments 54. Inhibiting forces due to rotor-to-housing clearances are reduced to extremely low values by virtue of the use of the floating load ring 74 or 74'. The latter load ring 74 or 74' also functions as a back-up sealing device with a restricted clearance, i.e., as a floating bushing, in the event of operational mishap. As shown, the floating load ring can be designed to be pressure-balanced to reduce inhibiting forces to nearly nil. The operation of a circumferential seal in an environment with pressure differences which represent more than a fifteen time increase over existing technology now rivals the pressure range that is achievable today only by the use of face-type seals.

High shaft speed testing has occurred for 5.6"-diameter seals of this invention in a gaseous environment at a pressure difference to-date of up to 225 psi. After 75 hours of testing, minimal contact between either the seal ring segments 54 and the shaft sleeve 34, or the floating ring insert 78 with the shaft sleeve 34, has been observed. No wear has been evidenced.

It is specifically intended that this invention not be limited to the particular embodiments disclosed as the best mode contemplated for carrying out this invention, but that the invention will include all embodiments falling within the scope of the appended Claims.

I claim:

1. A circumferential seal system especially useful in a fluid environment positioned in a housing for sealing along a rotating shaft rotatable in said housing, said housing having two fixed annular housing flanges therein receiving said shaft in the openings thereof respectively and axially spaced along said shaft, said shaft having an outer circumferential surface thereon extending through the openings in said spaced flanges, the first of said flanges being exposed on the radial side thereof that is remote from the second of said flanges to a first housing region of higher pressure, and the second of said flanges having the radially extending surface thereof remote from said first flange exposed to a second housing region of relatively lower pressure, said seal system being positioned between two confronting radial surfaces of said housing flanges to limit the fluid flow along said shaft from said first housing region to said second housing region, said sealing system including at least two tandemly spaced sealing devices of generally annular configuration positioned to receive said shaft in the central openings thereof respectively and located between said two confronting radial surfaces, one of said sealing devices comprising a segmented seal ring located adjacent said confronting surface of said first flange and formed from a material having adequate abradability, low density, low weight, and adequate lubricity, said segmented seal ring having a bore surface on the inner circumference of each segment, said segments being mounted to be movable radially toward and away from said shaft circumferential surface to form a primary seal and shaped to prevent leakage between adjacent segments, the second of said sealing devices comprising a floating load ring positioned between the confronting surface on said second flange and said segmented seal ring and mounted to float within limits in the space defined by said housing, said second flange, said segmented seal ring, and said shaft circumferential surface, said load ring having a radial surface thereon positioned to engage a radial surface on each segment of said segmented seal ring to form a secondary seal, said load ring having a radial sealing surface thereon, positioned to engage said confronting surface of said second flange to form an ancillary seal therebetween, and having its inner circumferential surface positioned to closely receive said shaft circumferential surface, an anti-rotation device extending from said housing to engage said load ring to prevent rotation of said load ring relative to said housing, first springs compressed between said confronting surface of said first flange and the adjacent radial surface of each segment of said seal ring to bias said segments away from said confronting surface of said first flange into engagement with said adjacent radial surface of said floating load ring to effect the secondary seal therebetween and moving the latter axially toward said confronting surface of said second flange, so that the radial surface of said load ring engages said last-mentioned confronting surface to effect said ancillary seal, a garter spring mounted on the outer circumferential surfaces of said seal ring segments to move said segments toward said outer circumferential shaft surface, with the bore surface of each of said segments movable to engage said shaft circumferential surface, said flange and said housing being shaped to expose the outer circumferential surfaces of said segmented seal ring and said load ring, and the radial surface of said segmented seal ring being located adjacent said confronting surface of said first flange to higher pressure in said first housing region, said bore surfaces on said seal ring segments each having a bearing region and an adjacent lift region thereon in tandem in the axial direction along said shaft, extending from said first housing region toward said second housing region, said bearing region being located adjacent said first housing region and said lift region being located downstream thereof in the direction of axial fluid flow, said seal ring segments having an essentially continuous circumferential sealing dam thereon located on said bore surface adjacent the downstream edge of said segments, said segments forming a circumferential groove disposed on the bore surfaces of said segments and located adjacent to said sealing dam on the upstream side thereof, said seal ring segments each having a plurality of feed grooves formed therein, extending from the side thereof exposed to high pressure fluid to pass such fluid into said circumferential groove, and at least one of said shaft outer circumferential surface and of said surfaces of said bearing regions of all of said seal ring segments having at least one shallow circumferentially extending lift pocket formed therein and positioned therein in alignment with the other of said surfaces, said one surface having an axially extending feed groove formed therein, communicating with each of said lift pockets and extending from each of said lift pockets to said high pressure region of said housing to feed high pressure fluid to each of said lift pockets to minimize contact between said bearing region of said segments and said shaft and to increase the life of said seal system.

2. The seal system of claim 1 wherein the shallow circumferentially extending lift pockets and axially extending feed grooves are formed in the bearing region of each of said seal segments.

3. The seal system of claim 1 wherein the shallow circumferentially extending lift pockets and axially extending feed grooves are formed in the outer circumferential surface of said shaft to underlie the bearing region of each of said seal segments.

4. The seal system of claim 1 wherein said shaft outer circumferential surface is made of a more wear-resistant material than the material forming the seal ring segments.

5. The seal system of claim 1 wherein said floating load ring has a downwardly facing insert secured thereto and formed from the same material as the seal ring segments, said insert being sized and positioned on said floating load ring to engage said second flange and to form the inner circumferential surface of said load ring.

6. The seal system of claim 1 wherein said outer circumferential surface of said shaft has a hard-face coating thereon to reduce the potential of wear of said outer surface.

7. The seal system of claim 1 wherein said radial surface of said load ring, positioned to engage said radial surface on each segment of said segmented seal ring, has a hard-face coating thereon to reduce the potential of wear of said load ring radial surface.

8. The seal system of claim 1 wherein at least one of said housing flanges is removably secured to said housing to permit inspection and refurbishment of said seal system.

9. The seal system of claim 1 wherein radially extending pressure-relieving grooves are formed in said radial surface of said load ring to relieve pressure at the secondary seal and permit relative radial movement between said load ring and said seal segments.

10. The seal system of claim 1 wherein said outer circumferential shaft surface has a first portion thereof disposed in alignment with said floating load ring of a smaller diameter than the portion of said shaft surface forming said primary seal between said shaft sleeve and said segmented seal ring, and said load ring having an annular nose portion thereon extending toward and closely receiving said first portion of said shaft sleeve in the opening therein.

11. The seal system of claim 10 wherein the clearance between said nose portion and said first portion of said shaft sleeve is on the order of about 5 milli-inches, and wherein said load ring is essentially pressure-balanced during seal operation.

12. The seal system of claim 11 wherein said floating seal ring has a downwardly facing insert secured thereto, and wherein said nose portion is formed on said insert.

13. The seal system of claim 12 wherein said downwardly facing insert has a second nose portion formed thereon to engage the surface of said confronting surface of said second flange forming said ancillary seal, and wherein the radial dimension of said second nose portion is essentially equal to the difference in radii between said first shaft sleeve portion and the portion of said shaft sleeve forming said primary seal.

14. In a seal system for a housing, having a rotating shaft extending therethrough, said housing having a pair of spaced annular flanges located axially along said shaft and receiving said shaft in the opening thereof, said housing having a first region of relatively elevated pressure adjacent one of said flanges and a second region of relatively lower pressure adjacent the second of said flanges, a sealing device positioned between said flanges for separating said first and second housing regions to permit only minimum leakage from said first housing region to said second housing region, only along a path between said sealing device and said rotating shaft, said sealing device including a pair of tandemly disposed seals located axially along said shaft between said flanges, one of said seals comprising an annular load ring having spaced radially extending sides, an outwardly facing axially extending outer surface and an inwardly facing central opening, said load ring having an annular insert fixedly secured thereon and overlaying said central opening therein, said annular load ring insert formed from a material having adequate abradability, low density, low weight, and adequate lubricity, and mounted to float yet closely receive said shaft in the opening thereof, with a small but finite predetermined clearance between said shaft and said insert, one of said radial sides of said load ring located adjacent and sealingly engaging said second of said flanges, the other of said seals, comprising a segmented annular seal sealingly engaging the other of said radial sides of said load ring, a first resilient device interposed between said segmented seal and said load ring to provide an axial biasing force between them, said segmented seal having a bore region with a circumferential sealing dam thereon, surrounding said shaft and biased into engagement therewith, at least one second resilient device biasing said segmented seal toward said shaft and biasing said segmented seal away from said first flange and toward said second flange, said segmented seal having at least one outwardly facing axially extending surface thereon, and said housing and said sealing devices being formed to expose the outwardly facing surfaces of said first and second seals to the elevated pressure of said first housing region.

15. The seal system of claim 14, wherein said segmented seal is formed substantially entirely from the same material as said load ring insert.

16. The seal system of claim 14, wherein said sealing dam on said segmented seal bore surface is located adjacent the load ring, so that leakage flow passes from said first housing region between the segmented seal and the shaft, then downstream across the sealing dam, and then between the shaft and said load ring insert toward said second housing region.

17. The seal system of claim 16, wherein said segmented seal has an annular bearing region thereon, on the bore region upstream of said sealing dam, and one of said bearing regions and said shaft having a plurality of lift pockets formed therein to urge said segmented seal away from said shaft in said bearing region.

* * * * *